United States Patent Office 2,715,581
Patented Aug. 16, 1955

2,715,581

PRODUCTION OF MAPLE SUGAR PRODUCTS HAVING ENHANCED FLAVOR

Charles O. Willits, North Hills, and William L. Porter, Philadelphia, Pa., assignors to the United States of America as represented by the Secretary of Agriculture No Drawing. Application November 21, 1952, Serial No. 321,958

3 Claims. (Cl. 99—142)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the production of maple sirup, maple sugar, and other maple products having enhanced flavor.

An object of this invention is to provide a process for developing a potent maple flavor in maple products. Another object is to provide maple products that can be greatly extended with bland sugars or sirups and still retain a true, full-bodied maple flavor.

Maple sirup and other maple products are usually made by boiling the sap at atmospheric pressure until the desired concentration is reached. It is now realized that the characteristic flavor of maple products is produced by the prolonged heating incidental to this atmospheric evaporation. In our Patent No. 2,549,877 we disclosed that the flavor of commercial maple sirup can be enhanced 4-fold or more by heating the sirup at 219–245° F. for several hours at atmospheric pressure.

We have now discovered that we can make a maple sirup having up to 20-fold the flavor of conventional fancy maple sirup by applying substantially the process of our patent mentioned above to maple sirup that has been prepared so as to avoid heat modification, as for instance, by vacuum evaporation at low temperature. It is known that when maple sap is concentrated to sirup without prolonged exposure to high temperature the sirup obtained is practically devoid of color and flavor. It is surprising, then, that application of our above-mentioned patented process to such bland maple sirup results in the production of several times as much maple flavor as does application of the process to ordinary, atmospheric-concentrated maple sirup.

A convenient way to produce the bland sirup for use in our present invention is to concentrate the sap in a vacuum evaporator at low temperature. We have found that higher temperatures are especially harmful when the sirup is in the range 30 to 65% solids if such temperatures are maintained for more than a short time.

In the preparation of a bland sirup by vacuum evaporation of sap we prefer to operate at a pressure such that the temperature is about 105° F. or less, especially while the sirup is in the range of 30 to 65% solids. The essential point is that the sirup to be processed according to this invention be a bland sirup; that is, a substantially colorless and flavorless sirup that has not been appreciably modified by exposure to heat.

In our process, the bland sirup of 65% or more solids content is further concentrated, by boiling at either atmospheric or reduced pressure, to about 90% solids and then is held at a temperature of 225 to 260° F., preferably at about 252° F., for a time sufficient to develop maximum flavor, usually about ½ to 3 hrs., preferably 2 hrs. Water may then be added to reduce the solids content to about 65% if a sirup is desired.

Our process is illustrated by the following example.

Example

*Bland sirup.*—Thirty-three kilograms of fresh maple sap containing 2.0% sugar was concentrated to 65.5% solids by boiling in a conventional circulating vacuum evaporator operated at a pressure such that the temperature did not exceed 105° F. The sirup so obtained was practically devoid of color and flavor. The yield was one kilogram.

*Flavor development.*—The bland sirup produced as described above was placed in a 2-quart steam kettle and heated with efficient stirring until the temperature of the boiling sirup gradually rose to 252° F. The kettle was then covered and the rate of heating was adjusted to just maintain boiling. The sides and cover of the kettle then served as a condenser for the vapors and the temperature remained substantially constant. After 2 hrs. at 252° the temperature was lowered to 200° and water was added to bring the solids content of the sirup to about 70%. The batch was then further cooled, after which the solids content was adjusted to 65.5% by the addition of a little water. The sirup thus produced had such a potent maple flavor that even when diluted with twenty times its volume of cane sugar sirup it still retained the full-bodied flavor of high-grade pure maple sirup. This diluted sirup had a very desirable light color because of the great dilution of the moderate color developed during the flavor development treatment.

We claim:

1. A process for producing high-flavored maple products which comprises concentrating maple sap to about 65% solids by vacuum evaporation at a temperature below about 105° F. to produce a bland sirup, then further concentrating the resulting bland sirup to about 90% solids by boiling at atmospheric pressure, then maintaining the temperature in the range 225 to 260° F. for a time sufficient to produce enhancement of the maple flavor.

2. A process as in claim 1 wherein the period of heating at 225 to 260° F. is about 2 to 3 hrs.

3. A process as in claim 1 wherein the temperature in the range 225 to 260° F. is about 252° F.

References Cited in the file of this patent

UNITED STATES PATENTS

| 1,642,789 | Sale et al. | Sept. 20, 1927 |
| 2,054,873 | Whitby | Sept. 22, 1936 |
| 2,237,981 | Ellis et al. | Apr. 8, 1941 |